UNITED STATES PATENT OFFICE.

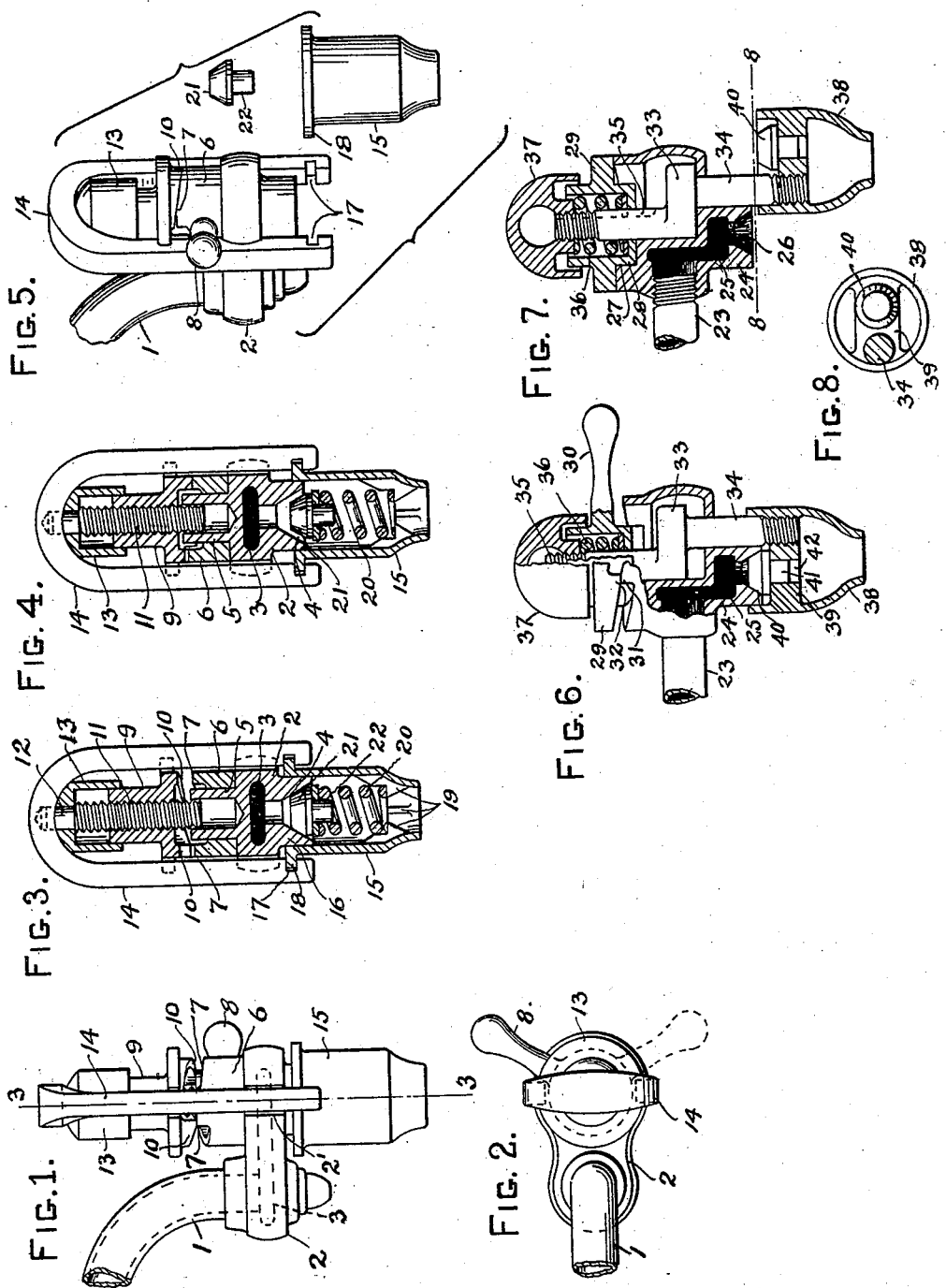

CHARLES B. STILWELL, OF WAYNE, PENNSYLVANIA.

FAUCET.

980,698.

Specification of Letters Patent.

Patented Jan. 3, 1911.

Application filed September 17, 1909. Serial No. 518,146.

*To all whom it may concern:*

Be it known that I, CHARLES B. STILWELL, a citizen of the United States, residing at Wayne, in the county of Delaware and State of Pennsylvania, have invented certain Improvements in Faucets, of which the following is a specification.

My invention is a faucet having, in its preferred form, a reciprocating nozzle containing a stopper for opening and closing the efflux port; the stopper being moved to close the port through means comprising a handle, a cam or worm and an elastic element.
The characteristic features of my improvements are disclosed in the following description and the accompanying drawings in illustration thereof.

In the drawings, Figure 1 is an elevation of a faucet embodying my improvements; Fig. 2 is a plan view of the same; Fig. 3 is a sectional view taken on the line 3—3 of Fig. 1 showing the closed position; Fig. 4 is a sectional view similar to that of Fig. 3 showing the open position; Fig. 5 is an elevation showing details detached; Fig. 6 is a sectional elevation of a faucet embodying a modified form of the improvements; Fig. 7 is a sectional elevation showing a second position of the modified construction; and Fig. 8 is a sectional view taken on the line 8—8 of Fig. 7.

The construction shown in Figs. 1 to 5, inclusive, comprises the pipe end 1 having fixed thereon the faucet body 2 which contains the passage 3 terminating in the port 4 through which the pipe discharges. A hollow cylindrical bearing 5 is formed on the body and revoluble on this bearing is a collar or ring 6 having thereon the cams 7, the collar being turned by a handle 8. A nut 9, having thereon the cams 10 which bear on the cams 7, engages a screw 11, which terminates in the arbor 12 and has the head 13 fixed thereto. A yoke 14 is engaged at its top by the arbor, has its bifurcations engaged by the notches 2' of the body, and engages a nozzle 15 adapted to reciprocate on the cylindrical bearing 16 depending from the faucet body, the yoke having the notches 17 at the lower ends of its bifurcations and the nozzle having the circular flange 18 at its top for engaging the notches. Brackets 19 within the nozzle support the coiled spring 20 and supported by the spring is a rubber stopper comprising the conical head 21 which fits the conical port 4 and the stem 22 which is disposed within the top of the spring. By turning the head 13 and thereby the screw 11, the yoke 14 can be lowered or elevated to disconnect or connect the nozzle 15 with relation to the bearing 16, thus permitting the ready dissociation or assemblage of the parts as well as the adjustment of the stopper with reference to the port.

With the parts assembled, by turning the handle 8 clockwise the collar 6 with the cams 7 thereon are revolved to permit the descent of the cams 10, nut 9, screw 11, yoke 14 and nozzle 15, thus lowering the stopper and opening the port. When the handle and collar are turned anti-clockwise, the cam action elevates the yoke and nozzle, the latter acting through the spring on the stopper to close the port. As the stopper and its support are elastic, the flow is stopped without the usual shock and injury to the distribution system that result from quickly closing faucets of usual construction.

The modified construction shown in Figs. 6 to 8, inclusive, comprises the pipe end 23 having fixed thereto the faucet body 24 provided with the passage 25 and the port 26 through which the pipe discharges. A cylindrical bearing 27 of the body receives a cylindrical hub 28 of a ring or collar 29 which is adapted to be turned by the handle 30 thereon, the body having the cams 31 and the ring the cams 32 engaging therewith. A crank shaft 33 is set in the body, the shaft having thereon the member 34 extending downwardly through the body and the offset member 35 extending upwardly through the body and the ring. A coiled spring 36, set within and supported by the ring, surrounds the member 35, and a head 37, which is screwed on the member 35, engages the spring. A nozzle 38 has therein the cross piece 39 which is screwed on the member 34 and carried by the cross piece is a rubber stopper having the conical head 40 which is adapted to fit the conical port 26 and the stem 41 which fits in the socket 42, the top of the nozzle telescoping with the bottom of the body.

The parts are readily dissociated, assembled and adjusted by means of the screw connections of the parts 37 and 38 with the part 33 and the separable character of the part 29.

When the parts are assembled, in the relation shown in Fig. 6, the nozzle 38 is held elevated and the stopper head 40 closes the efflux port 26, through the action of the cams 31 and 32 due to turning the handle 30 clockwise, the action having elevated the ring 29, the spring 36, the head 37, and the crank shaft 33. As the force which seats the stopper within the port is applied through the spring, the flow is stopped without the shock that results in quickly closing the usual faucet.

Having described my invention, I claim:

1. A faucet having a port, a nozzle having a reciprocating movement, and an elastic device carried by said nozzle for controlling said port.

2. A faucet having a body containing a port, a reciprocating nozzle, carried by said nozzle a stopper adapted for controlling said port, a handle, a cam revoluble by said handle, and means comprising a cam operated by said revoluble cam for moving said nozzle.

3. A faucet having a body containing a port, a cam ring having a revoluble connection with said body, a reciprocating stopper for controlling said port, and connected with said ring means comprising a cam, a spring and a nozzle for moving said stopper.

4. A faucet having a body containing a port, a nozzle connected with and adapted to reciprocate relatively to said body, a stopper reciprocated by said nozzle to control said port, and means comprising a reciprocating rod and a handle for moving said nozzle and stopper.

5. A faucet having a body provided with a bearing, engaging said bearing a ring provided with a cam, a reciprocating nozzle, means comprising a cam operated by said ring for elevating said nozzle, a spring supported in said nozzle, and a stopper supported by said ring.

6. A faucet having a body provided with a bearing, a cam revoluble relatively to said bearing, a nut having a cam coacting with said cam first named, a rod engaging said nut, a yoke carried by said rod, a nozzle carried by said yoke, a spring carried by said nozzle and a stopper carried by said spring.

7. A faucet having a port, a reciprocating nozzle with which said port communicates, a stopper for controlling said port, and means comprising a spring whereby said stopper is reciprocated.

8. A faucet having a port, a reciprocating nozzle with which said port communicates, a stopper for controlling said port, and a spring through which said nozzle carries said stopper.

In witness whereof I have hereunto set my name this 14th day of September 1909, in the presence of the subscribing witnesses.

CHAS. B. STILWELL.

Witnesses:
ROBERT JAMES EWING,
C. N. BUTLER.